United States Patent [19]

Mock et al.

[11] Patent Number: 4,648,722

[45] Date of Patent: * Mar. 10, 1987

[54] PLASTIC WATCH CASING WITH PLASTIC CRYSTAL AND PROCESS FOR JOINING THE CRYSTAL TO THE CASING

[75] Inventors: Elmar Mock, Pery; Jacques Müller, Reconvilier, both of Switzerland

[73] Assignee: ETA S.A., Fabriques d'Ebauches, Granges, Switzerland

[*] Notice: The portion of the term of this patent subsequent to Dec. 17, 2002 has been disclaimed.

[21] Appl. No.: 778,038

[22] Filed: Sep. 20, 1985

Related U.S. Application Data

[62] Division of Ser. No. 522,779, Aug. 12, 1983, Pat. No. 4,558,957.

[51] Int. Cl.$^4$ ............................................. G04B 37/00
[52] U.S. Cl. ................................... 368/294; 368/280; 368/309; 368/236

[58] Field of Search .................................. 368/294–296, 368/280, 309, 236

[56] References Cited

U.S. PATENT DOCUMENTS 4,558,957  12/1985  Mock et al. .................... 364/294

Primary Examiner—Bernard Roskoski
Attorney, Agent, or Firm—Pollock, Vande Sande & Priddy

[57] ABSTRACT

To simplify fitting and sealing the crystal (4) to the casing (2, 6, 8), assembly is effected by means of ultrasonic welding. The casing (2, 6, 8) and the crystal (4) are made of synthetic materials which are thermo-weldable to each other. The mating faces (8a, 4b) of the peripheral wall (8) of the casing and the crystal (4) are formed for reducing the contact area between the two parts to permit thermo-welding by subjecting the assembly to high-frequency mechanical vibrations imparted by a tool (15).

6 Claims, 7 Drawing Figures

PLASTIC WATCH CASING WITH PLASTIC CRYSTAL AND PROCESS FOR JOINING THE CRYSTAL TO THE CASING

This is a division of application Ser. No. 522,779, filed Aug. 12, 1983, now U.S. Pat. No. 4,558,957.

TECHNICAL FIELD

The present invention concerns plastic watch casings having plastic crystals and a process for joining the crystal to the casing. More precisely, the invention is concerned with joining a crystal of transparent organic material to a plastic watch casing, with the joint being sealed and permanent.

BACKGROUND ART

Various processes for sealing the crystal to the casing of a watch have been proposed, which make use of the thermoplastic properties of crystals of certain organic materials. According to U.S. Pat. No. 2,607,082, a watch crystal made of thermoplastic material and provided with an external groove is pressed into a metal rim on a watch casing. The metal rim has a rib which projects inwardly of the watch casing to engage the groove in the plastic crystal. The assembly of rim and crystal is then placed on a carrier within coils of an induction heating apparatus. The metal rim is thus heated, which softens the plastic material of the crystal in the region of the rib on the rim, whereby the plastic material is caused to flow around the rib, producing a sealed joint. It will be readily appreciated, however, that this process cannot be used if the watch casing is itself made of a plastic material.

French Patent Application No. 2,491,644 proposes, for the purposes of sealing a crystal of organic material to a watch casing, that the rim for mounting the crystal be provided with a groove which is directed inwardly of the rim. The crystal is supported on a shoulder portion of the rim and a heated punch member of annular shape is applied to the periphery of the crystal to cause plastic deformation thereof, thereby causing a part of the plastic material to flow into the groove in the rim. While such a process makes it possible to produce a sealed joint between the crystal and the rim while avoiding the use of a mechanical joining member or any adhesive, the process produces results which are not generally satisfactory from the aesthetic point of view. In fact, the deformation which is due to the annular punch member being applied to the crystal occurs at the front face thereof. In addition, such methods of fixing the crystal in place involve not inconsiderable mechanical forces in order to cause deformation of the plastic. Such forces induce in the final article internal stresses which affect the ageing qualities of the casing to which the crystal is joined.

DISCLOSURE OF THE INVENTION

In order to remedy such disadvantages, a first object of the present invention is to provide a process for joining a plastic crystal to a plastic watch casing, which does not require the application of substantial mechanical forces.

A second object of the invention is to provide a joining process which effectively ensures a sealed joint, without preliminary complex machining operations, or delicate operations to be performed when assembling the components.

A third object of the present invention is to provide a process for mounting the crystal in a casing of synthetic plastic material, which makes it possible to enhance the rigidity of the casing, by virtue of the presence of the crystal.

To attain such aims, a watch according to the present invention comprises a casing and a crystal which are both made of thermoplastic materials which can be thermo-welded or heat-sealed together. The mating faces at the periphery of the crystal and on the casing are preferably machined to define small surfaces of contact therebetween. Mechanical energy, for example in the form of ultrasonic energy, is applied to the crystal after it has been set in position on the casing. Such energy is partially transmitted to the casing by way of the small surfaces of contact, thereby producing localized heating and partial fusion of the crystal and the casing at the location of surfaces of contact. The result is a fused or welded joint caused by localized migration of the materials forming the casing and the crystal.

In this way the heating effect is highly localized in the crystal and in the casing, which gives rise to deformation phenomena which are equally highly localized. In addition, the assembly operation is effectively performed by the thermo-welding operation and not by a mechanical connection which is produced by deformation, for example, of the periphery of the crystal. Accordingly, the generation of internal stresses in the crystal and in the casing is minimized. The thermo-welding and the resultant partial fusion of the case and crystal materials ensure a permanent connection and a very good seal between the crystal and the watch casing. The thermo-welding is accompanied by axial displacement of the crystal, which makes it possible to overcome dimensional errors, within certain limits. The invention also concerns a process for joining a plastic watch casing to a plastic crystal by thermo-welding the two elements.

BRIEF DESCRIPTION OF THE DRAWINGS

Other features and advantages of the invention will be more clearly apparent from the following description of a number of embodiments of the invention which are given by way of non-limiting example. The description refers to the accompanying drawings in which.

BEST MODE FOR CARRYING OUT THE INVENTION

Figure 1:
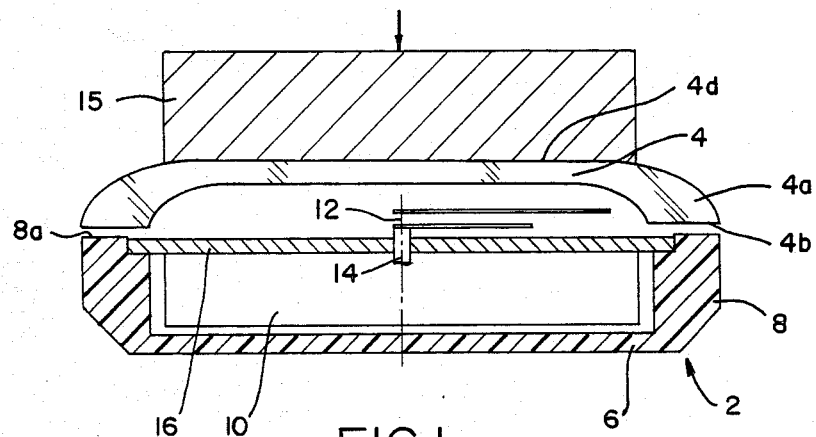
FIG. 1 is an elevation, sectional view of a watch, for illustrating the process of this invention.

FIG. 1 shows in simplified form a watch casing 2 and a crystal 4 which is not yet secured to the casing and which serves to close the casing. In the embodiment illustrated, the casing 2 is a monobloc casing in which the bottom 6 and the peripheral wall 8 of the casing are made from one and the same piece. As is well known, the casing contains a movement which is diagrammatically indicated by the rectangle 10 from which project the spindles 12 and 14 for the hands, extending through a dial 16. According to the invention, the casing 2 is made of thermoplastic material. In such a case, the internal surfaces of the casing, in most instances, comprise a certain number of machined or molded features used for fixing or positioning certain elements of the movement. As is well known, the movement 10 essentially comprises a stepping motor, a gear train for driving the spindles 12 and 14, an electric circuit and a time base for controlling the motor, and finally a battery for supplying power to the motor and the various electronic components. It will be seen that the illustrated embodiment is an analog display watch of electronic type. It will be clearly apparent to the man skilled in the art that the invention could equally well be applied to a mechanical analog-display watch or a digital-display electronic watch.

The casing 2 and the crystal 4 are made of thermoplastic materials which can be thermo-welded together. The casing 2 may be formed for example from one of the materials commonly referred to as ABS, ASA or SAN, which respectively correspond to an acryl butadiene styrene, an acryl styrene acrylester and a styrene acryl nitrile. In such cases, the crystal 4 is made of a transparent acrylic PMMA (polymethylmethacrylate), such as those sold under the trademark Plexiglass. The casing 2 and the crystal 4 may also be made from polycarbonates, the polycarbonate forming the crystal obviously being transparent. It will be appreciated that it is possible to use other pairs of materials, provided that they can be thermo-welded together.

It should also be noted that the peripheral wall 8 and the periphery 4a of the crystal 4 have mating faces 8a and 4b. At the time of assembly, the faces 4b and 8a of the crystal and the casing are disposed against each other. According to the invention, and as will be described in greater detail hereinafter, at least one of the faces 4b and 8a is machined to provide a small surface of contact therebetween and thereby permit the two parts to be effectively welded together and produce a sealed joint. In order to effect thermo-welding the two parts, sufficient pressure is applied to the upper face 4d of the crystal 4 to ensure intimate contact between the mating faces 4b and 8a. At the same time, energy is transmitted to the peripheral side wall 8 at the location of the face 8a, by virtue of the close contact between the two surfaces. The combination of the pressure applied to the crystal at a small surface of contact and the application of energy produces highly localized heating and fusion of a part of the mating faces, thus producing a real weld between the two parts. That is, not only do the two parts experience highly localized heating, but also the thermo-welding operation produces interpenetration by fusion of the materials forming the two parts in question.

Preferably, the thermo-welding operation is effected by ultrasonic means. Using a tool 15 known in the art as a sonotrode, a mechanical vibration of an amplitude in the range of 3 to 50 μm is transmitted to the crystal 4, at a high frequency of the order of 40 kHz. The whole of the crystal begins to oscillate synchronously with the sonotrode. By providing a zone of lower mechanical strength in the contact zone, considerably higher stresses are generated at the contact zone than in the remainder of the system. The first zone to begin to go into a condition of fusion is that which absorbs the greatest mechanical forces; so that, the fusion effect does in fact occur in the contact zone. As will be more clearly apparent from the description hereinafter, the geometries of the mating faces 8a and 4b are such as to provide a local zone of lower mechanical strength, which is the first zone to begin to fuse.

Figure 2:
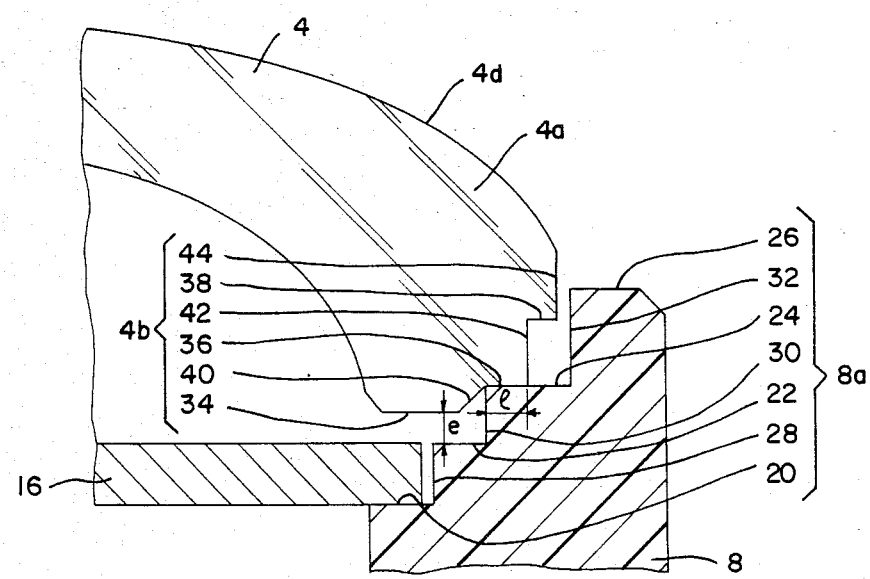
FIG. 2 is an enlarged, elevation, sectional view of part of the periphery of the crystal and the periphery of the casing, showing a first embodiment of the geometry of the mating faces.

FIG. 2 shows one embodiment of a suitable geometry for the mating faces of the crystal and the peripheral side wall of the watch casing. In FIG. 2, the two parts are shown in a position before the thermo-welding operation. As the crystal and casing are machined to be rotationally symmetrical about the axis of the watch, at least when the watch is circular, only their cross-sectional geometries will be described herein. Starting from the region which is the most inwardly disposed region of the watch and from the inside surface of peripheral wall 8, the illustrated construction has axially and radially spaced, radially extending interior portions 20, 22, 24 which are parallel to the plane of the watch; a radially extending external portion 26 at the upper edge of peripheral wall 8; and axially extending interior portions 28, 30, 32 which are parallel to the axis of the watch. The portions 20, 22, 24 and 28, 30, 32 thus define three steps, going from the center of the watch toward the outside thereof and the upper face of the casing. Similarly, the assembly face 4b at the periphery of the crystal comprises three axially and radially spaced, radially extending portions 34, 36, 38 which are parallel to the plane of the watch casing. Portions 34, 36, 38 are connected by a radially outwardly extending, inclined portion 40 and by two axially extending portions 42, 44 which are parallel to the axis of the watch. As shown, portion 44 extends from portion 38 to the outside face 4d of the crystal.

Portions 20, 28 define an annular recess for receiving the periphery of the dial 16. The portions 22 and 30 define an annular recess into which projects the frusto-conical part of the crystal defined by the inclined portion 40, so as to center the crystal on the casing during the thermo-welding operation. The radially extending portion 36 of the periphery of the crystal, which is substantially narrower than the radially extending portion 24 of the peripheral wall 8 disposed opposite thereto, defines a zone l involved in the thermo-welding operation, zone l being of reduced mechanical strength. A radial clearance is provided between the axially extending portion 32 of the peripheral wall 8 and the axially extending portion 44 of the crystal. By way of example, in the case of a watch whose outside diameter is of the order of 31 mm, the dimension l involved in the thermo-welding operation, that is, the width of the zone of contact of the portions 24 and 36, is about 0.25 mm. It will be seen therefore that the surfaces which are actually in contact are of very small area.

In addition, before the thermo-welding, an axial clearance e is provided between radially extending portions 22 and 34. For example, the clearance e is about 0.2 mm. During the thermo-welding operation, under the effect of the pressure applied, radially extending portions 24 and 36 are brought into intimate contact. For the reasons indicated above, this causes partial fusion of portion 36 of the crystal and portion 24 of peripheral wall 8, and causes the crystal to be pushed inward under the effect of the applied pressure until radially extending portions 22 and 34 come into contact. As already referred to above, the thermo-welding preferably is achieved by ultrasonic energy which is applied to the crystal by means of a tool 15 such as a sonotrode.

The purpose of the radial clearance between axially extending portions 32 and 44 is to limit the contact surfaces between the crystal and the peripheral wall 8 to those surfaces where the thermo-welding is actually to occur, that is, to the annular contact surface defined by radially extending portions 36 and 24. This arrangement avoids wasting energy since all the ultrasonic energy is concentrated in the narrow annular contact surface of radially extending portions 36 and 24. The projecting or overlapping part of the radially extending portion 34 of the crystal, by covering the periphery of the dial 16, ensures that the dial is held in position in the recess defined by radially extending portion 20 and axially extending portion 28. With regard to the inward movement e of the crystal relative to the casing during thermo-welding, it is possible to produce a sealed weld between the crystal and the casing, even if there are defects in respect of co-planarity between radially extending portions 24 and 36, provided of course that such defects do not exceed the value e. Significantly, the only effect of the pressure applied to the crystal is to cause the crystal to be pushed inward as local fusion progresses between the crystal and the peripheral wall 8. The forces are therefore low and the internal stresses resulting therefrom are also greatly reduced. The foregoing description relates to the case of a rotationally symmetrical crystal. The man skilled in the art will readily appreciate that the process may be applied irrespective of the complexity of the contour of the glass.

Figure 3A:
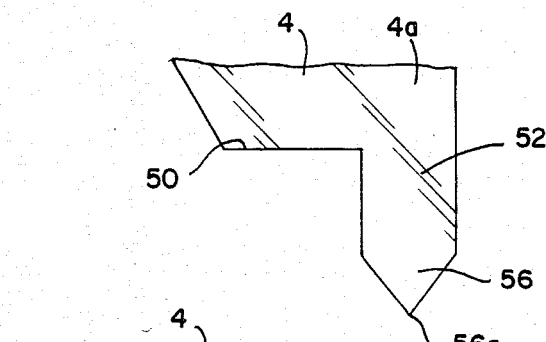
FIGS. 3a and 3b are views respectively of part of the periphery of the crystal and the periphery of the casing, showing a second embodiment of the geometry of the crystal and the watch casing.
Figure 3B:
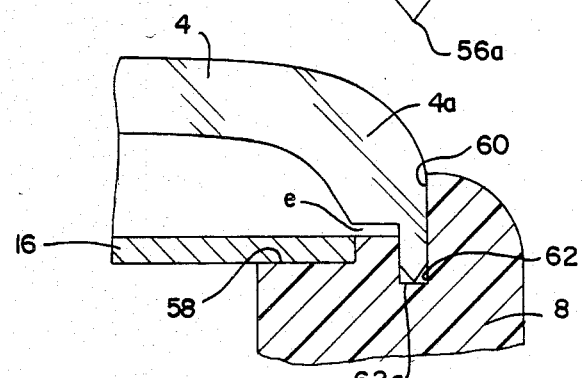

FIGS. 3a and 3b show an alternative form for the peripheral geometries of the crystal and the casing. FIG. 3a shows the geometry of the assembly face of the periphery 4a of the crystal. The machined portions comprise a radially extending contact face 50 which is parallel to the plane of the casing, and from which projects an annular axially extending rib 52. The lower end of the rib 52 terminates in a tapered portion 56 having a sharp edge 56a. As can be seen from FIG. 3b, the geometry of the assembly face of the peripheral wall 8 comprises a first radially extending recess or face portion 58 for receiving the dial 16, and a second axially extending face portion 60 for receiving the periphery of the glass. Portion 60 terminates at an axially extending, annular groove 62 having a flat bottom 62a on which the sharp edge 56a rests prior to thermo-welding. During thermo-welding, the sharp edges 56a is in contact with the bottom 62a of the groove 62, thereby forming a zone of reduced mechanical strength. The axial length of the rib 52 is greater than the axial depth of the groove 62, to leave the clearance e when the parts are set in position before the thermo-welding operation. Thus, the energy applied to the crystal causes heating and local fusion of the edge 56a and the peripheral wall 8 in the vicinity of the bottom 62a, which results in a welding effect, at the location of the sharp edge 56a of the rib. In this operation, the crystal is also pushed inwardly relative to the casing, with such inward movement being limited by the abutment face 50 of the crystal, which also comes up against the periphery of the dial 16 in order to fix it in position.

Figure 4B:
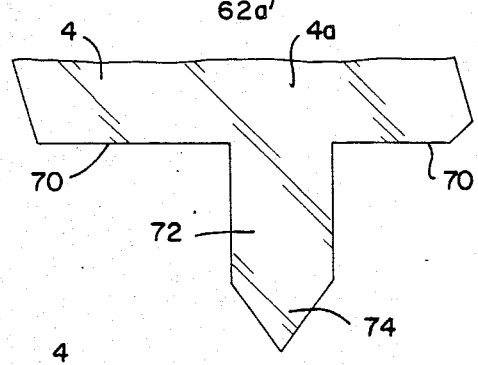
FIG. 4a shows a second alternative embodiment of the geometry of the casing and the periphery of the crystal and FIGS. 4b and 4c respectively show in greater detail a preferred geometry of the periphery of the crystal, which can be used in the second alternative embodiment illustrated in FIG. 4a, and the final configuration of the joined casing and crystal, after the thermo-welding step.
Figure 4A:
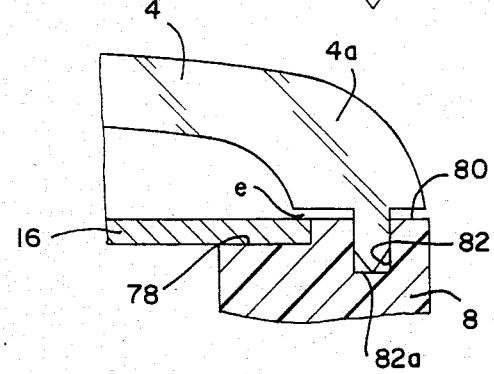

The embodiments illustrated in FIGS. 2 and 3 leave a part of the peripheral wall 8 visible on the front face of the watch. The embodiment illustrated in FIGS. 4a, b, c corresponds to the situation where the crystal is to cover the whole of the front face of the peripheral wall 8. As can be seen from FIG. 4b, the geometry of the periphery of the crystal comprises a radially extending support or contact face 70 from which projects an annular axially extending rib 72 which may be identical to that shown in FIG. 3a and has a tapered sharp-edged portion 74. As shown in FIG. 4a, the geometry of the assembly face of the peripheral wall 8 comprise a radially extending recess or face 78 for receiving the dial 16 and a radially extending support surface 80 having therein an axially extending, annular groove 82 with a flat bottom 82a. In the thermo-welding operation, the ultrasonic vibration produces partial fusion of the sharp-edged portion 74 and the bottom 82a of the groove, causing the two parts to be welded together and causing the whole crystal to be moved inwardly with respect to the casing, under the effect of the pressure applied thereto.

Figure 4C:
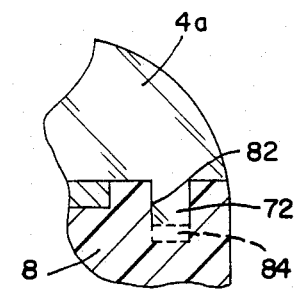

FIG. 4c shows the two parts after the thermo-welding operation. The abutment face 70 has come into contact with assembly face 80 of the peripheral wall 8. The thermo-welding has caused the pointed edge portion 74 to disappear and has resulted in a fused region indicated at 84, in which the material is formed by interpenetration of the materials respectively forming the peripheral wall 8 and the crystal.

It will be apparent from the foregoing description that the invention actually makes it possible to produce a sealed, irremovable mounting for the crystal on the watch casing, by means of simple operations which do not significantly affect the mechanical strength of the two parts to be assembled. It will also be appreciated that, having regard to the fact that the crystal and the casing are joined together by thermo-welding, the two parts behave from the mechanical point of view as if they formed just one piece. That results in a substantial improvement in the rigidity of the whole watch casing. This is a highly desirable result insofar as, in most cases, many machined or molded features are formed in the bottom of the casing, for housing the various components of the watch. The rigid interconnection of the crystal and casing avoids the need to provide additional components for reinforcing the casing.

We claim:

1. A watch comprising a casing, a crystal closing said casing and, within said casing, a movement and a dial, wherein said casing is made of a thermo-weldable synthetic material and comprises an abutment face, said crystal is made of a material which is thermo-weldable to the material forming said casing and comprises an abutment face, and the crystal is secured to said casing solely by a thermo-weld comprising a fused mixture of the materials of both said crystal and said casing, said dial being locked between said abutment faces so as to mount said dial directly on said casing beneath said crystal.

2. A watch according to claim 1, wherein said casing is made of acryl butadiene styrene (ABS), acryl styrene acryl-ester (ASA) or styrene acryl nitrile (SAN), and the crystal is made of a transparent acrylic resin (PMMA).

3. A watch according to claim 1, wherein said casing and said crystal are made with polycarbonates.

4. A watch according to claim 1, wherein said crystal includes a slanting surface portion for centering said crystal with respect to said casing prior to formation of said thermo-weld.

5. A watch according to claim 1, wherein said crystal includes a rib which projects toward said casing and said casing includes a groove receiving said rib, said thermo-weld being located at the free end portion of said rib and at the bottom of said groove.

6. A watch according to claim 1, wherein said abutment face is parallel to the plane of said casing.

* * * * *